Feb. 21, 1939.  T. B. DOE  2,148,262
POWER TRANSMISSION
Filed April 15, 1937  5 Sheets-Sheet 1

INVENTOR
THOMAS B. DOE
BY
Ralph L. Tweedale
ATTORNEY

Feb. 21, 1939.　　　　T. B. DOE　　　　2,148,262
POWER TRANSMISSION
Filed April 15, 1937　　　5 Sheets-Sheet 2
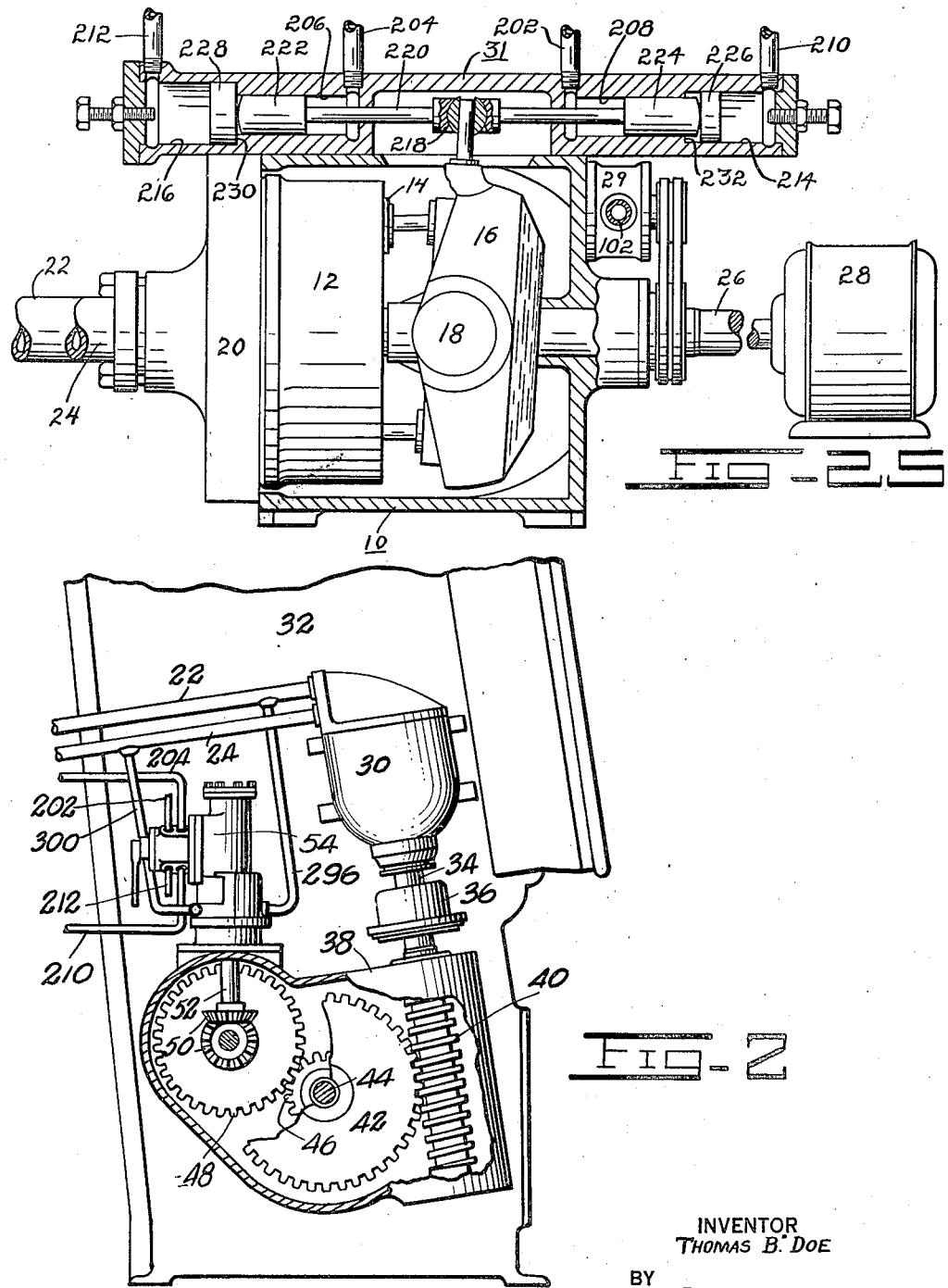
INVENTOR
THOMAS B. DOE
BY
Ralph L. Tweedale
ATTORNEY Feb. 21, 1939.                    T. B. DOE                    2,148,262
POWER TRANSMISSION
Filed April 15, 1937              5 Sheets-Sheet 3
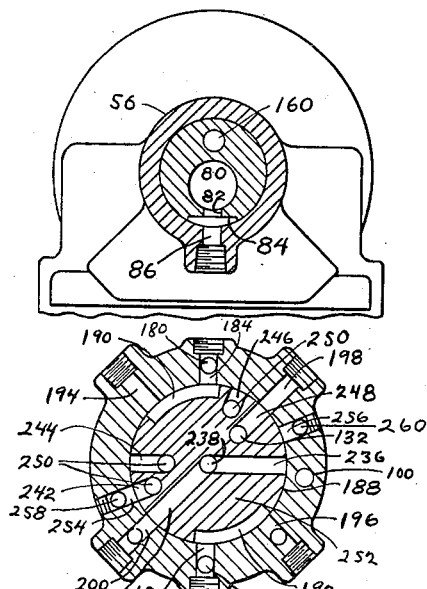
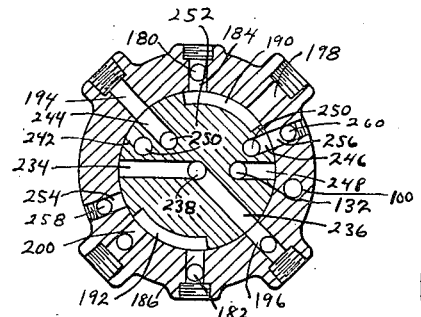
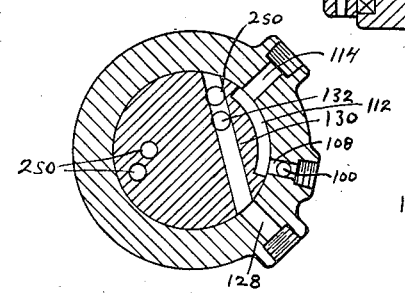
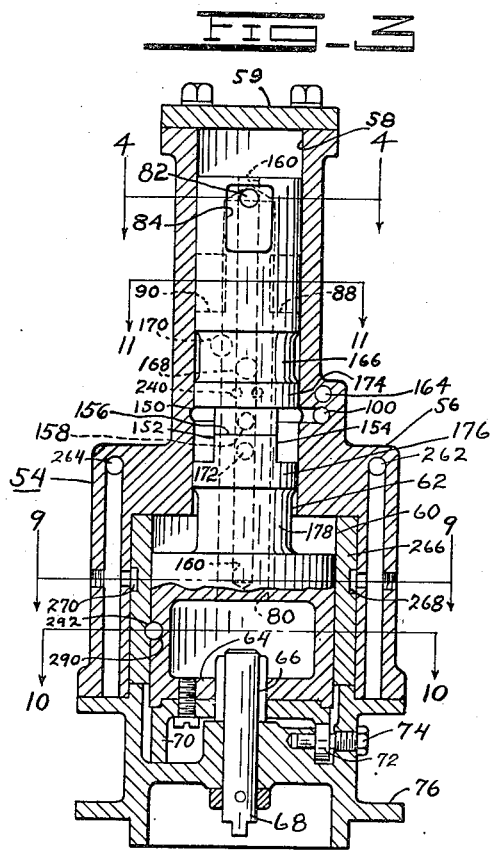
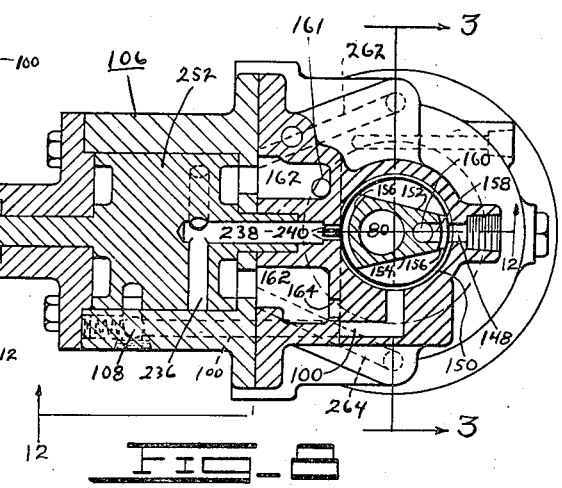
INVENTOR
THOMAS B. DOE
BY
ATTORNEY Feb. 21, 1939.　　　　T. B. DOE　　　　2,148,262
POWER TRANSMISSION
Filed April 15, 1937　　　5 Sheets—Sheet 4
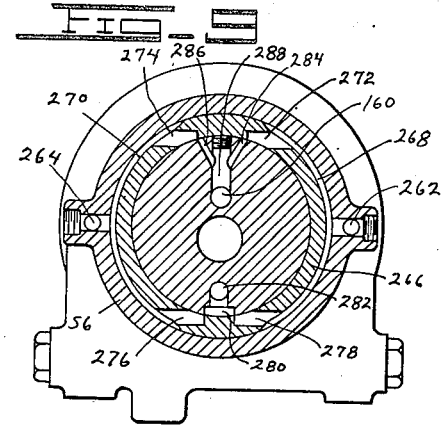
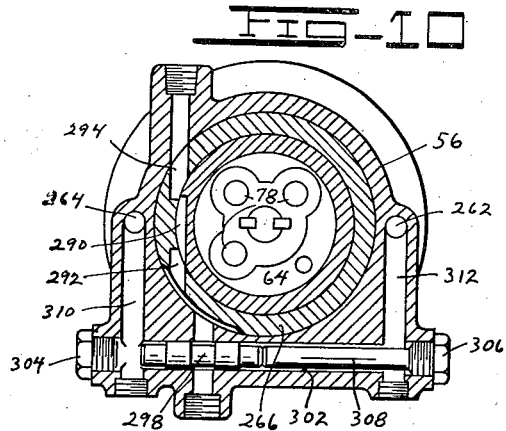
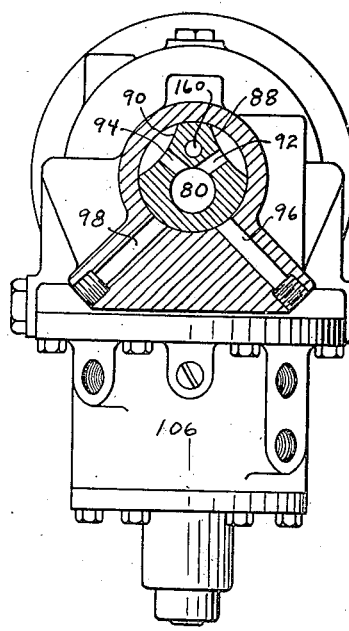
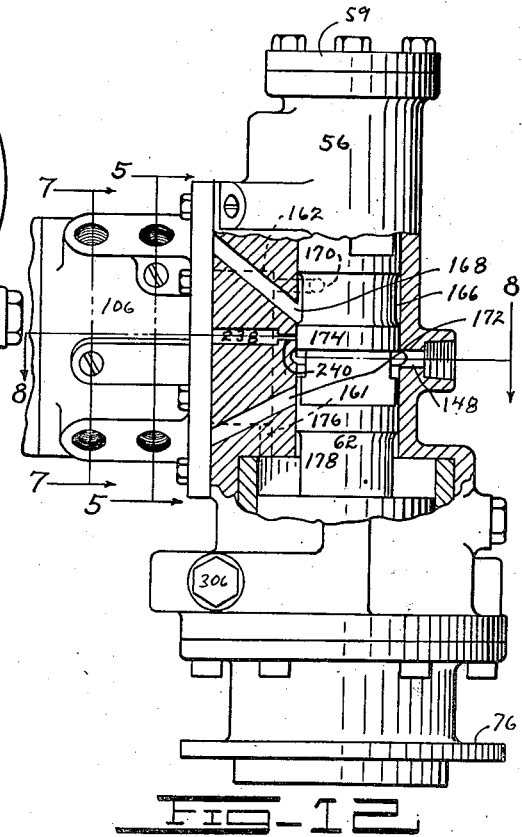
INVENTOR
THOMAS B. DOE
BY
ATTORNEY

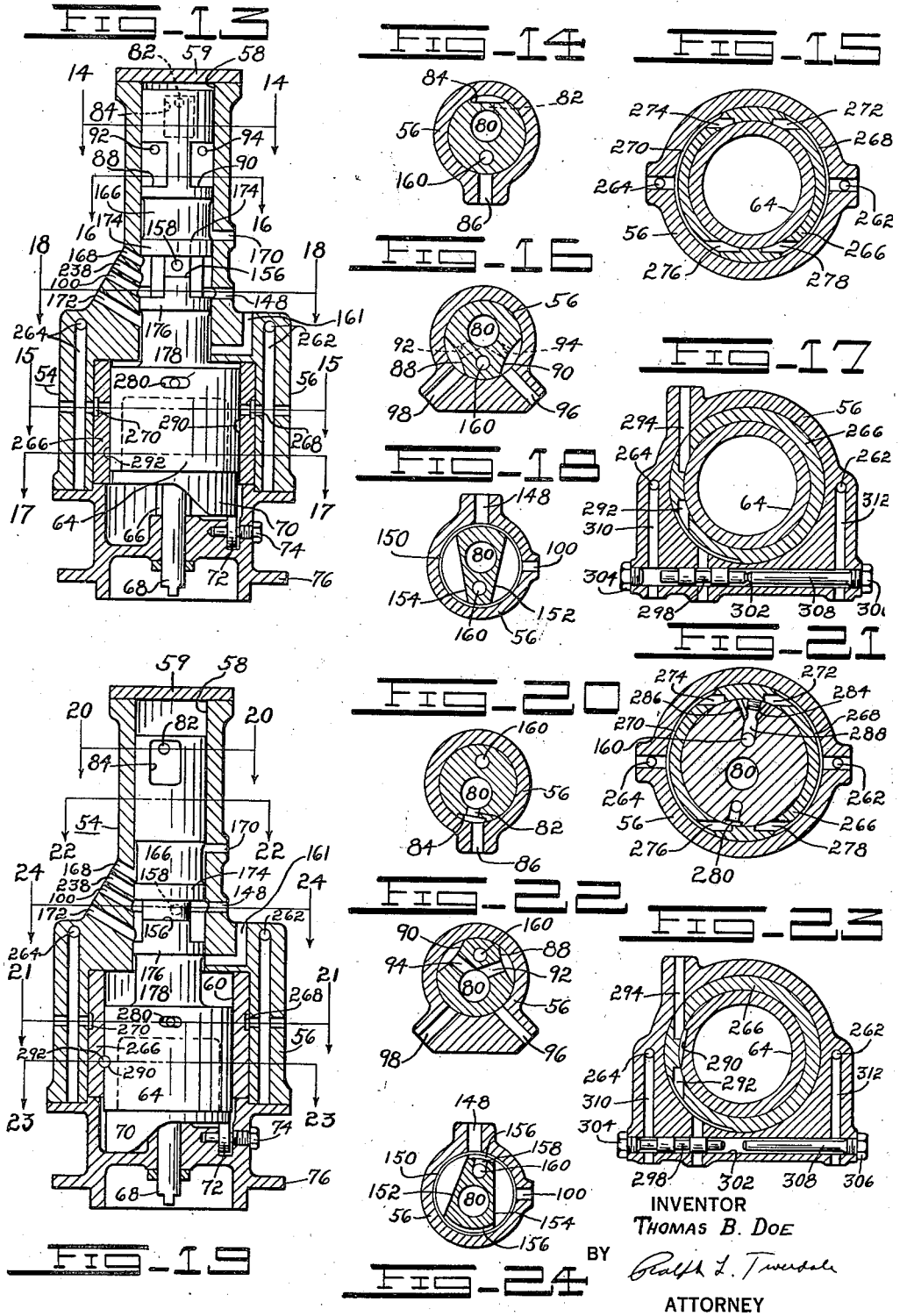

Patented Feb. 21, 1939

2,148,262

UNITED STATES PATENT OFFICE 2,148,262

POWER TRANSMISSION

Thomas B. Doe, New York, N. Y., assignor to The Waterbury Tool Company, Waterbury, Conn., a corporation of Connecticut Application April 15, 1937, Serial No. 137,079

14 Claims. (Cl. 60—53)

This invention relates, generally, to power transmissions and the invention has reference, more particularly, to a novel fluid or hydraulic pressure operated and controlled drive system adapted to automatically drive a load device through a predetermined cycle of operation. Such a power transmission is adapted for use with many different load devices with which it is desirable to be able to control the acceleration and deceleration precisely for driving the device with varying velocity through a predetermined cycle of operation.

For example, the present invention is particularly suitable for hoists or conveyors for transporting articles from one point to another. If the articles to be transported are of a fragile or delicate nature, such that damage is likely to occur if they are subjected to jars and jolts, it becomes desirable to provide a conveyor drive which will insure not only that the conveyor itself does not cause any jarring of the articles loaded thereon but also that the conveyor may be loaded and unloaded by the attendants without requiring a high degree of dexterity to insure against damage occurring when placing articles thereon and removing them therefrom while maintaining a reasonably high speed of transportation on the conveyor.

These and other considerations make it desirable to provide a conveyor drive which may be controlled to operate, for example, a chain type conveyor, at varying speeds and with varying accelerations and decelerations under precise and positive control. Thus, for example, in some conveyor installations it is desirable to operate the conveyor intermittently with a period of rest for loading at one end and unloading at the other end, and then upon the completion of loading and unloading to move the conveyor through the distance required to bring an article into place at the unloading station and an empty flight into place at the loading station. It is desirable to so control the conveyor drive as to make this movement start and stop with the maximum acceleration and deceleration, respectively, consistent with the previously mentioned limitations regarding jarring of the articles on the conveyor.

Heretofore, chain type conveyors or hoists have largely been driven by electric motors, either directly or through reduction gearing, and in order to obtain the wide variations in speed required to operate such hoists efficiently, it has been necessary, even when using a D. C. supply, to employ a complicated and easily deranged system of electric rheostats and control units. It is far preferable to use an A. C. supply with the result that it has been exceedingly difficult, if not impossible, to obtain the desired speed variation necessary for the efficient operation of electric motor driven chain type hoists owing to the inherent nature of A. C. motors to operate at constant or synchronous speed, and as a result, attempts have been made to operate some chain hoists continuously at constant speed, which is not only inefficient because of the necessarily low speed of operation, but is hard on the attendants since they must load and unload the articles while the conveyor or hoist is moving, and this must be done without undue jolting or jarring of the fragile articles.

The principal object of the present invention is to provide a novel hoist or chain conveyor drive that is operated and controlled by fluid or hydraulic pressure, thereby insuring smooth, quiet and vibrationless operation of the hoist or conveyor driven thereby, the said novel drive when applied to a hoist serving, upon the loading of an article on to the receiving end of the temporarily stationary hoist and the removal of an article from the delivery end thereof, provided an article has reached the hoist delivery end, firstly, to automatically start and accelerate the hoist or conveyor chain with a maximum feasible acceleration for a short period, secondly, to drive the hoist or conveyor at a substantially constant speed for a short interval, and thirdly, to decelerate the hoist with a maximum feasible deceleration to a stop, the hoist chain having moved a distance equal to the space between successive chain flights during such period of motion, whereupon the operation or cycle is again automatically repeated, and so on as long as desired, the hoist moving intermittently and the articles being loaded and removed during the periods when the hoist is stationary. Alternatively the second or constant speed step in the operating cycle may be omitted when it is possible to use the full movement for acceleration and deceleration.

More specifically it is an object to provide a cyclic control system for a hoist drive or other power transmission apparatus embodying an acceleration-deceleration control means driven with the hoist and operable independently thereof to initiate a cycle of operation, such control means including a unitary valve device partaking of both reciprocatory and rotary motion.

It is also an object to provide such a control means incorporating means for maintaining the hoist in a predetermined position of rest after the completion of a cycle of movement and preferably including means for controlling a by-pass across the transmission circuit as well as means for controlling the displacement of the pump portion of the power transmission in the event of displacement of the conveyor from the predetermined position of rest.

Further objects and advantages of the present invention will be apparent from the following description, reference being had to the accompanying drawings wherein a preferred form of the present invention is clearly shown.

In the drawings:

Fig. 2 is a side view partly in section showing the mounting of the conveyor driving and controlling mechanism on the loading end of the conveyor.

Fig. 3 is a longitudinal cross section of a control valve forming part of the present invention.

Fig. 4 is a cross section on line 4—4 of Fig. 3.

Fig. 5 is a cross section on line 5—5 of Fig. 12.

Fig. 6 is a view corresponding to Fig. 5 showing the parts in a different position.

Fig. 7 is a cross section on line 7—7 of Fig. 12.

Fig. 8 is a cross section on line 8—8 of Fig. 12.

Fig. 9 is a cross section on line 9—9 of Fig. 3.

Fig. 10 is a cross section on line 10—10 of Fig. 3.

Fig. 11 is a cross section on line 11—11 of Fig. 3.

Fig. 12 is a side view partially in section on line 12—12 of Fig. 8.

Fig. 13 is a diagrammatic cross section of the control valve illustrating in Fig. 3 showing the parts in a second position.

Fig. 14 is a cross section on line 14—14 of Fig. 13.

Fig. 15 is a cross section on line 15—15 of Fig. 13.

Fig. 16 is a cross section on line 16—16 of Fig. 13.

Fig. 17 is a cross section on line 17—17 of Fig. 13.

Fig. 18 is a cross section on line 18—18 of Fig. 13.

Fig. 19 is a diagrammatic cross section of the control valve illustrated in Fig. 3 showing the parts in a third position.

Fig. 20 is a cross section on line 20—20 of Fig. 19.

Fig. 21 is a cross section on line 21—21 of Fig. 19.

Fig. 22 is a cross section on line 22—22 of Fig. 19.

Fig. 23 is a cross section on line 23—23 of Fig. 19.

Fig. 24 is a cross section on line 24—24 of Fig. 19.

Fig. 25 is a sectional view of a variable displacement pump forming part of the present invention.

Figure 1:
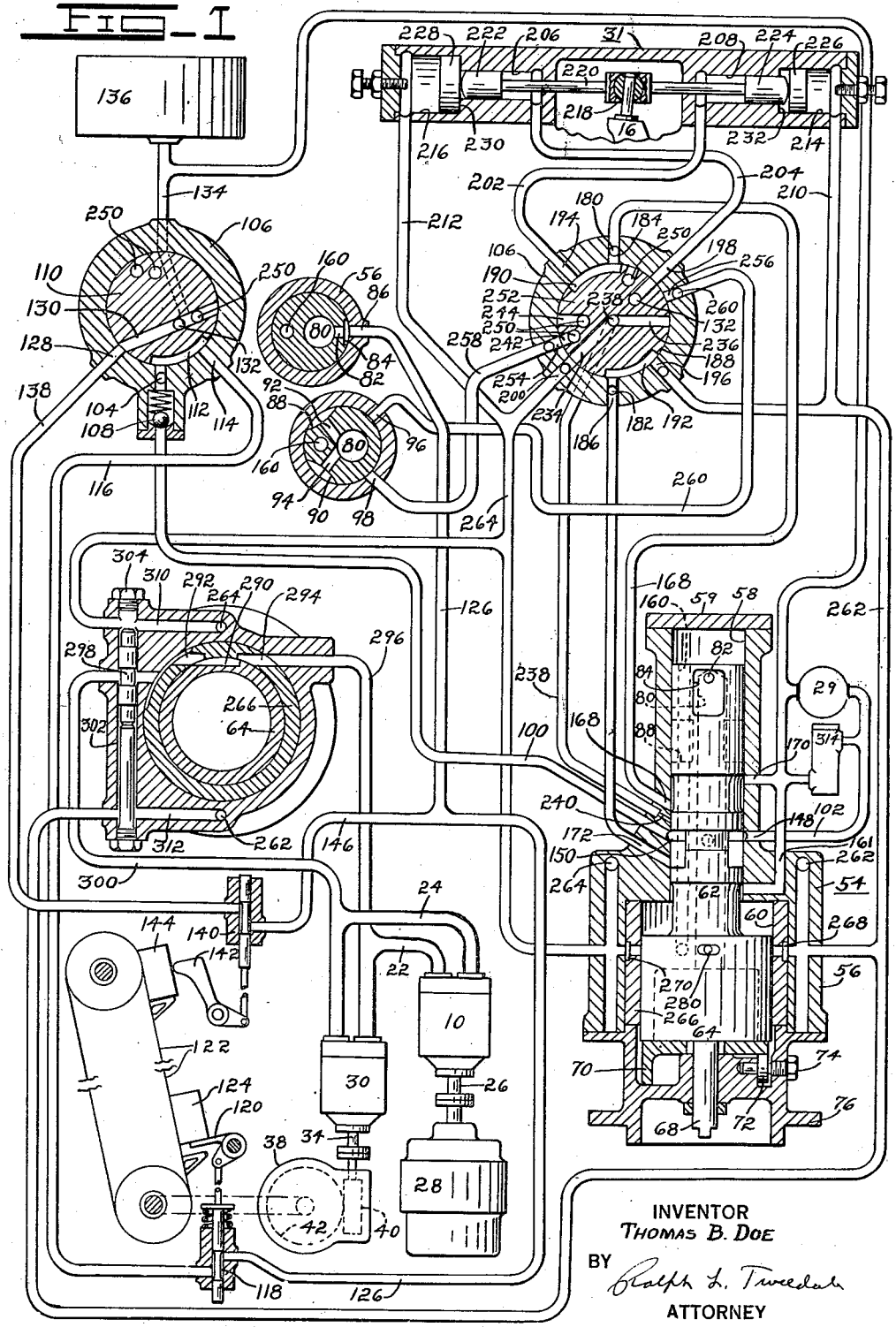
Fig. 1 is a schematic view showing the hydraulic circuits incorporated in a preferred form of the present invention.

Referring now to Figs. 2 and 25 the conveyor driving mechanism includes a variable displacement pump 10 which is shown as of the well-known "Waterbury" construction comprising a revolving cylinder barrel 12 within which pistons 14 are reciprocable to varying degrees depending upon the angular position of a tilting box 16 which is adjustable about trunnions 18. The fluid is brought into the cylinder barrel through a valve plate 20 from a supply conduit 22 and is pumped to a delivery conduit 24. The shaft 26 of the pump 10 may be driven by a suitable prime mover such as an electric motor 28. The motor 28 also drives an auxiliary pump 29 which serves to supply fluid under pressure for control purposes. The displacement of the pump 10 is under the control of a fluid motor 31, later to be described.

Conduits 22 and 24 lead to a fixed displacement fluid motor 30 disposed on the hoist casing 32 and having a shaft 34 connected by a coupling 36 to a gear box 38. The motor 30 may also be of the "Waterbury" construction. The coupling 36 drives a worm 40 meshing with a worm gear 42 which is keyed to a sprocket shaft 44 carrying the driving sprocket, not shown, for the conveyor chain. Also keyed to the shaft 44 is a timing gear pinion 46 meshing with a timing gear 48 which drives through bevel gearing 50 a shaft 52 for operating a control valve 54. The ratio of gearing 46, 48 and 50 is such that the shaft 52 makes one revolution for each flight or cycle of movement of the hoist chain.

The construction of the main control valve is illustrated in Figs. 3 through 12. Figs. 1 and 13 through 24 are diagrammatic only and depart from the actual construction in some particulars for the sake of clearness. Portions of the mechanism appear in more than one place in Fig. 1 and several conduits are shown as pipes whereas they are actually short drilled passages. In Figs. 13 and 19 the circumferential locations of all ports in the valve body have been shown as if in the plane of cross section. The control valve 54 comprises an automatically operated portion which functions to control the displacement of the pump 10 for acceleration-deceleration control and for centering the conveyor between cycles and which also controls a by-pass between the conduits 22 and 24 to assist in centering. The valve 54 also includes a manually operable portion, the function of which is to change all connections necessary to be changed when it is desired to reverse the direction of movement of the conveyor.

The automatically operated portion of the valve 54 is illustrated in Fig. 3 from which it will be seen that the valve comprises a body 56 having a small bore 58 in its upper portion and a larger bore 60 in its lower portion. The upper end of bore 58 is closed by a cap 59. Slidably and rotatably mounted in the bores 58 and 60 is a movable valve element 62, the bottom wall 64 of which is splined at 66 to a stub shaft 68 which is detachably connected to the shaft 52 (Fig. 2). Secured to the wall 64 is a cam 70, the outline of which is symmetrical and appears in Figs. 13 and 19. The cam 70 cooperates with a roller 72 pivoted on a stud 74 secured to the body 56. The body 56 is detachably mounted on the gear casing 38 by a flange 76. The lower wall 64 and the adjacent portion of cam 74 are pierced by apertures 78 (Fig. 10).

Extending through the interior of the member 62 is a bore 80 which may be connected either to control fluid pressure from the auxiliary pump 29 or to exhaust, for the purpose of raising the valve member 62 upwardly from the position illustrated in Fig. 3 independently of any movement of the stub shaft 68. The bore 80 communicates by a radial bore 82 (Fig. 4) with a recess 84 which cooperates with a port 86 formed in the body 56. The vertical height of the recess 84 is sufficient so that it is in communication with the port 86 regardless of vertical movements of the valve member 62. The circumferential width of the recess 84 is such that it will be cut off from the port 86 after a small rotation of the valve member 62 from the position of Fig. 4. It will be seen that if pressure fluid is admitted to the port 86 that this pressure will be transmitted through conduits 82 and 80 and through apertures 78 to exert a lifting force on the valve member 62, causing the same to rise to its upper limit of movement.

The valve member 62 may also be rotated by the stub shaft 68 and when so rotated, the cam 70 determines the lowest position which it is possible for the valve member 62 to reach at any particular angular position thereof. Thus, when the valve member is rotated to the position of Fig. 13, the cam 70 holds the valve 62 in its upper position regardless of whether fluid pressure exists beneath the valve 62 or not.

Referring now to Fig. 11, the member 62 is provided with two recesses 88 and 90 symmetrically positioned on the opposite side of the valve member 62 from the recess 84. The recesses 88 and 90 communicate by bores 92 and 94 with the bore 80. The vertical height of the recesses 88 (see Fig. 3) is great enough so that they may communicate with ports 96 and 98 irrespective of the vertical position of the valve member 62. The circumferential width of the recesses 88 and 90 and their angular disposition are such that the recess 90 opens to the port 98 after something over 180° of clockwise rotation from the position of Fig. 11 and cuts off before 360°. The recess 88 cooperates with the port 96 in a similar manner on counterclockwise rotation. The port 98 is normally connected to exhaust during clockwise rotation of the valve member 62 while the port 96 is blocked. During counterclockwise rotation the port 98 is blocked while the port 96 is connected to exhaust. Thus, the recess 90 insures that the space beneath the valve member 62 is drained during the time that the cam 70 permits the valve member 62 to drop during clockwise rotation and the recess 88 performs the same function for counterclockwise rotation. In either case, the recess which is not effective connects the bore 80 to exhaust during the interval while the valve member 62 is maintained in its highest position by the cam 70.

The control of the admission of pressure fluid to the port 86 is accomplished by an interlock circuit (see Fig. 1) comprising a conduit 100 which is constantly in communication with the pressure side of the auxiliary pump 29 through a conduit 102 and across the bore 58 of the valve 54. Conduit 100 leads to a port 104 in a manually operable reverse valve 106, a pressure drop valve 108 being incorporated in the line 100 at port 104 for the purpose of maintaining pressure in the conduits 100 and 102 when the line beyond the pressure drop valve 108 may be connected to exhaust. The movable member 110 of the reverse valve 106 has a recess 112 connecting the port 104 with a port 114 in the position shown in Figs. 1 and 7 which is the position when the reverse valve is set to hoist. Port 114 communicates by a conduit 116 with a lower trip interlock valve 118 which is operable by a lower trip lever 120 adjacent the conveyor chain 122. When an article such as 124 is placed on the conveyor at the loading end thereof, the trip 120 is depressed opening the valve 118 and permitting pressure fluid to pass to a conduit 126 leading to the port 86.

The valve 106 also includes a port 128 which, in the hoist position, connects with a transverse bore 130 which communicates by a longitudinal bore 132 with the exhaust side of the system indicated diagrammatically in Fig. 1 by the conduit 134 leading to the expansion tank 136. In the reverse position when the valve 106 is set for lowering movement of the conveyor, the port 128 is connected to the port 104 while the port 114 is connected to the other end of the bore 130. The port 128 is connected by a conduit 138 with an upper trip interlock valve 140 which is controlled by an upper trip lever 142 actuated by the delivery of an article, such as 144, at the unloading end of the conveyor. When the article 144 is removed, the valve 140 closes, thus blocking off the exhaust connection to the conduit 126 which is established through a branch conduit 146 whenever the valve 140 is open.

It will thus be seen that with the reverse valve 106 set for hoist, the control fluid pressure can be transmitted to the port 86 only when both the valve 118 is open and the valve 140 is closed. Thus, the initial lifting of the valve member 62 by fluid pressure is conditioned upon both the presence of an article, such as 124, at the loading station and the absence of an article, such as 144, at the unloading station. During lowering operation of the hoist, the converse is true so that the valve member 62 can not lift until an article such as 144 has been positioned on the conveyor at the upper end thereof and an article such as 124 has been removed from the conveyor at the lower end thereof.

Referring again to Figs. 3 through 8, the body 56 includes a port 148 to which the fluid delivered by the auxiliary pump 29 is delivered from conduit 102. The port 148 communicates with an annular groove 150 formed in the body 56 and to which the conduit 100 is connected. The valve member 62 is provided with recesses 152 and 154 (see Fig. 8) which are connected by annular grooves 156 adjacent the top of the recesses 152 and 154 and of less vertical extent than the latter. The shorter of the grooves 156 communicates by a bore 158 with a longitudinal bore 160 opening at its upper end into the upper end of the bore 58 for the purpose of transmitting control fluid pressure to the upper face of the valve member 62 in all positions of the valve 62. The space between the small bore 58 and the large bore 60 of the body 56 is connected to the exhaust side of the system through a hole 161 and a chamber 162 formed in the body 56 and connected to the expansion tank 136 through a passage 164.

The valve 62 is adapted to control acceleration and deceleration of the conveyor by connecting the portions of the fluid motor 31 to either control fluid pressure or exhaust. For this purpose an annular groove 166 is formed on the member 62 and, in the position illustrated in Fig. 3, connects a port 168 (see Fig. 12) with the exhaust side of the system by a short bore 170 connecting to the chamber 162. The recesses 152 and 154 and the annular groves 156 control communication between the pressure inlet port 148 and a port 172. A land 174 is formed on the member 62 between the groove 166 and the recesses 152 and 154. A land 176 is also formed below the recesses 152 and 154 and extends upwardly to the grooves 156 between the recesses 152 and 154. Below the land 176, the member 62 is reduced at 178 to connect the port 172 with exhaust when the member 62 is lifted upwardly to the limit of its movement. The ports 168 and 172 lead to the body of the reverse valve 106 where they communicate with longitudinal bores 180 and 182 (Fig. 5). Radial bores 184 and 186 connect the bores 180 and 182 to the interior bore 188 of the valve 106. Recesses 190 and 192 are adapted to form a six-way valve connecting the ports 184 and 186 either with ports 194 and 196 respectively or with ports 198 and 200 respectively.

Ports 194 and 198 are connected by pipes 202 and 204 to the inner ends of small cylinders 206 and 208 in the control motor 31. The ports 196 and 200 are connected by pipes 210 and 212 to the outer ends of larger cylinders 214 and 216 formed in the control motor 31. The tilting box 16 is connected by a pivoting and sliding connection 218 to a rod 220 carrying pistons 222 and 224 slidable in the cylinders 206 and 208. Loosely abutting the pistons 222 and 224 and slidable in the cylinders 214 and 216 are larger auxiliary pistons 226 and 228. The shoulders 230 and 232 are so positioned that when the piston 228 abuts the shoulder 230, as in the drawings, the tilting box is in a small stroke in the hoisting direction and when the piston 226 abuts the shoulder 232 and the piston 224, the tilting box 16 is in a small stroke in the lowering direction.

The reverse valve 106 also includes a pair of radial bores 234 and 236 communicating with an axial bore 238 leading to two small ports 240 in the valve body 56 lying opposite the land 174 when the valve is in the position shown in Fig. 3. The bore 234 communicates with port 200 in the hoist position of the valve shown in Fig. 5 while the bore 236 communicates with the port 196 in the lowering position illustrated in Fig. 6. Four short radial bores 242, 244, 246 and 248 connect with the longitudinal bore 132 and other similar bores 250, each of which extends from end to end of the reverse valve movable member 252 and connects with the exhaust chamber 162. The bore 242 is adapted to register with a port 254 and bore 248 is adapted to register with the port 198 in the position of Fig. 5, while the bore 244 registers with the port 194 and the bore 246 registers with a port 256 in the position of Fig. 6. The ports 254 and 256 are connected by conduits 258 and 260 with the ports 98 and 96, respectively, for the purpose of blocking off the port 96 and connecting the port 98 to exhaust in hoist position and for establishing the opposite connection in lowering position.

Branch conduits 262 and 264 are formed in the valve body 56 to extend downwardly along the side of the large bore 60 and connect with conduits 210 and 212, respectively. Bore 60 is provided with a separate liner 266 having nearly semi-annular grooves 268 and 270 (Fig. 9) formed on its outer surface and communicating with the passages 262 and 264. Four centering ports 272, 274, 276 and 278 communicate with the grooves 268 and 270. The large diameter portion of the valve member 62 is provided with an exhaust centering port 280 communicating by a bore 282 with the space between the bores 58 and 60. The port 280 in the position shown in Fig. 9 lies mid-way between the ports 276 and 278 and is adapted to open to one or the other upon rotation of the valve member 62 in either direction away from neutral or rest position. Also formed on the large portion of the valve member 62 are two small pressure ports 284 and 286 which communicate by a radial bore 288 with the longitudinal bore 160 which is subject at all times to control fluid pressure. The centering ports 280, 284 and 286 are adapted to move out of register with their cooperating ports 272, 274, 276 and 278 whenever the valve member 62 is lifted out of the position shown in Fig. 3.

Below the plane of the centering ports, the large portion of the valve 62 is provided with a notch 290 (Fig. 10) which normally closes communication between a pressure port 292 and an exhaust port 294. The port 294 is connected by a branch conduit 296 with the low pressure side 22 of the main power circuit, while the port 292 is connected through a shuttle valve 298 and branch conduit 300 to the high pressure side 24 of the main fluid circuit. The shuttle valve 298 is formed in a lateral bore 302 closed by end plugs 304 and 306. The latter has a long stem 308 forming a stop for the shuttle valve 298. The opposite ends of the bore 302 are in communication by transverse bores 310 and 312 with the branch conduits 262 and 264, respectively. The shuttle valve 298 is closed whenever pressure exists in conduit 262, while it is opened when pressure exists in conduit 264.

In operation, the motor 28 being started, the pump 10 is caused to operate, delivering fluid into the conduit 24 and withdrawing fluid from the conduit 22 in accordance with the setting of the tilting box 16. The auxiliary pump 29 supplies fluid for control purposes through the delivery conduit 102, a relief valve 314 permitting fluid in excess of control requirements to pass to the exhaust side of the system. Between normal cycles of operation of the conveyor 32 the tilting box normally rests in the position illustrated in the drawings which is slightly to the right of neutral or zero displacement position; that is, the pump 10 is in a small stroke tending to drive the conveyor in the hoisting direction. The small quantity of fluid thus pumped is normally passed through the by-pass 300, 298, 292, 290, 294, and 296 when the conveyor is in rest position; that is, with a carrying lug immediately beneath the lower trip 120. When an article such as 124 has been placed on the lower trip 120 and an article such as 144 has been removed from the upper end of the conveyor, the lower trip valve 118 is opened and the upper trip valve 140 is closed. With the reverse valve 106 set to hoist, control fluid pressure will be admitted to the interlock circuit from the auxiliary pump through conduit 102, port 148, groove 150, conduit 100, pressure drop valve 108, port 104, recess 112, port 114, conduit 116, valve 118 and conduit 126 to the port 86. The upper trip valve 140 closes off the drain path for control fluid pressure through conduit 138, port 128 and conduits 130 and 132.

In rest position the movable member 62 lies in the position shown in Figs. 1, 3, 4, and 8 through 12, being maintained in this position by control fluid pressure constantly present in the upper end of the bore 58 through conduits 158 and 166 (Fig. 8). Upon admission of control fluid pressure to the port 86, this pressure is exerted through the bore 80 to the space beneath the movable member 62 to lift the member 62 upwardly to the limit of its movement. In this position the cam 70 is considerably spaced from its follower roller 72. The upward shift of the valve member 62 connects port 168 with control fluid pressure from the groove 150 and connects port 172 with the exhaust side of the system through the space between bores 58 and 60 and through passages 161, 162, and 164. Control fluid thus passes from port 168 to the port 184 of the reverse valve 106 and through recess 190, port 194, and conduit 202 to the small cylinder 208. The piston 224 moves to the right in Fig. 1 carrying with it the free piston 226. Fluid from the large cylinder 214 is exhausted through conduit 210, port 196 of the reverse valve, recess 192, port 186, and port 172 of the main control valve to exhaust. The tilting box 16 is thus moved into stroke in a hoisting direction at a speed determined by the volume of fluid delivered by the auxiliary pump 29.

The greatly increased volume of fluid delivered by the pump 10 is too great for passage through the small by-pass 290 so that the fluid motor 30 is caused to operate, thus driving the conveyor with a rate of acceleration determined by the velocity of the piston 224. As the fluid motor 30 starts to move, the valve member 62 is rotated therewith through the shaft 68 and splined connection 66. The initial rotation of the valve member 62 cuts off recess 84 from the port 86 thereby trapping the fluid below the valve member 62 and effectively preventing any downward movement thereof, regardless of any possible change in the position of interlock valves 118 and 140.

Assuming the driving connections between the conveyor and the control valve 54 to be such that the movable member 62 rotates clockwise in Fig. 11 during hoisting operation, it will be seen that the recess 88 will open to the port 98 after something over 90° of rotation. Prior to this occurrence, however, the cam 70 has rotated sufficiently to bring its highest part on to the roller 72 thus positively holding the valve member 62 in its highest position even though the space beneath the member 62 is connected to drain through port 98, conduit 258, port 254 of the reverse valve, port 242, and bore 250. Upon something over 180° of rotation, the recess 90 opens to the port 98 connecting the space below the valve member 62 with exhaust. In the interval while the recess 90 is in communication with port 98, the cam 70 travels from a position where its highest part is on the roller 72 to a position where its lowest portion is on the roller 72. The valve member 62 thus moves downwardly under the urge of fluid pressure exerted in the upper end of the bore 58.

The connections of acceleration control ports 168 and 172 in the main control valve are thus reversed so that port 168 is connected to exhaust through port 170 leading to chamber 162, and port 172 is connected to control fluid pressure because the recess 152 is opposite the port 172. Port 172 is shown by dotted lines in Fig. 3 for clearness, whereas it actually lies on the left side of line 3—3 in Fig. 8 (see Fig. 12). The same is true of ports 168 and 170. Control fluid pressure is thus transmitted from port 172 through port 186 of the reverse valve, recess 192, port 196, and conduit 210 to the large cylinder 214. The cylinder 208 is connected to exhaust through conduit 202, port 194, recess 190, port 184, and port 168. The pistons 226 and 224 are thus caused to travel to the left reducing the stroke of the pump 10 until the piston 222 abuts the piston 228, as in the position shown in the drawings. The piston 228 at this time is normally maintained against the shoulder 230 by control fluid pressure transmitted from conduit 102 through the valve ports 240, conduit 238, conduit 234, port 200 and conduit 212 and trapped there by the land 174 closing off the ports 240 just before the valve member 62 reaches its lowest position. During the deceleration of the conveyor which takes place as the tilting box 16 moves to main stroke position, the valve member 62 continues to turn and the recess 152 cuts off from port 172, thus trapping fluid in the cylinder 214 also.

As the conveyor approaches rest position, the centering ports 280, 284, and 286 (Fig. 9) come into operation, the exhaust port 280 connecting with the stationary port 278 and the pressure port 286 connecting with the stationary port 274. Pressure fluid is thus admitted to the cylinder 216 through groove 270, and conduit 264 to conduit 212 while the cylinder 214 is connected to exhaust through conduit 210, conduit 262 and groove 268. Inasmuch as the piston 228 is already against the shoulder 230, no movement of the tilting box 16 takes place at this occurrence. Continued travel of the conveyor and valve 62 into rest position brings the centering valve to cut-off position at both pressure and exhaust ports and opens the by-pass notch 290 sufficiently to pass all the fluid delivered by the pump 10 at minimum stroke position. The gravity load of the articles 124, 144, etc., on the hoist chain constantly tend to back the hoist down. If this occurs the by-pass 290 is closed, permitting sufficient pressure to build up in conduit 24 to raise the hoist back to its intended position of rest.

Under conditions when the conveyor is lightly loaded, the friction of the conveyor chain and its driving mechanism may be so great as to prevent back travel of the hoist under gravity load and the light load may also permit overtravel of the hoist at the end of a cycle. Such a condition is illustrated in Figs. 19 through 24 wherein the centering valve pressure port 284 is connected to stationary port 272, admitting control fluid pressure to cylinder 214 through groove 268, conduit 262 and conduit 210. Under these conditions the exhaust centering port 280 also opens to the stationary port 276, connecting the cylinder 216 to exhaust through groove 270, conduit 264, and conduit 212. The piston 226 is thus moved to the left in Fig. 1 against the shoulder 232, carrying the tilting box 16 past neutral position into a small stroke in the lowering direction. At the same time the shuttle valve 298 is shifted upwardly in Fig. 1 by the pressure exerted in conduit 262 and transmitted through conduit 312 and by the connection of conduit 310 with the exhaust pressure in conduit 264. The by-pass 290 is thus closed so that the conveyor moves downwardly until the centering valve passes cut-off position and opens port 286 to port 274, and port 280 to port 278. Thereupon the connections of cylinders 214 and 216 are reversed and shuttle valve 298 is opened so that the conveyor comes into rest position at a slower speed than formerly and centers as described in normal operation. As soon as another article 124 is placed on the lower trip 120 and the delivered article 144 is removed from the unloading station, the interlock circuit is again rendered effective and the cycle of operation is repeated. The cylinder 216 is of somewhat larger diameter than cylinder 214 so that when the centering valve is cut off, any leakage into both cylinders equally will not move the tilting box out of minimum stroke position.

If it is desired to operate the conveyor to lower articles, the reverse valve 106 is turned to the position illustrated in Fig. 6. This operation reverses the connection of the interlock valves 118 and 140 to exhaust and to the control fluid conduit 100 so that the interlock circuit can be rendered effective only when both an article is present at the upper trip 142 and an article has been removed from the lower trip 120. The reversal of valve 106 also transposes the connections of the cylinders 206, 208, 214, and 216 with the main control valve 54 so that cylinders 206 and 216 are controlled in the same manner as were cylinders 208 and 214, respectively. Under these conditions the tilting box 16 is moved into full lowering stroke to accelerate and returned to minimum lowering stroke to decelerate. The action of the entire mechanism is thus similar to that previously described except that the conveyor travels in the opposite direction. Also in lowering operation the shuttle valve 298 is normally closed as the conveyor approaches rest position so that overtravel is purposely induced at each cycle and the conveyor is brought to rest by upward movement with the shuttle valve 298 open and the by-pass 290 effective.

While the form of embodiment of the invention as herein disclosed, constitutes a preferred form, it is to be understood that other forms might be adopted, all coming within the scope of the claims which follow.

What is claimed is as follows:

1. In a fluid pressure operated power transmission system the combination of a fluid pump, a fluid pressure motor, a member movable to control the supply of fluid delivered from the pump to the motor, an article handling device driven by the motor, and means to control operation of the article handling device in intermittent cycles of movement with predetermined acceleration and deceleration, said means including a second fluid motor for operating said member, and a unitary valve partaking of rotary and reciprocating movement and driven by said first fluid motor to control said second fluid motor.

2. In a fluid pressure operated power transmission system the combination of a fluid pump, a fluid pressure motor, a member movable to control the supply of fluid delivered from the pump to the motor, an article handling device driven by the motor, and means to control operation of the article handling device in intermittent cycles of movement with predetermined acceleration and deceleration, said means including a second fluid motor for operating said member, and a unitary valve partaking of rotary and reciprocating movement and driven by said first fluid motor to control said second fluid motor, said valve including a portion operable to control the supply of fluid to said first motor between cycles.

3. In a fluid pressure operated power system the combination of a reversible variable displacement pump, a fluid pressure motor, continuously open supply and return conduits connecting said pump and motor, a member movable to vary the displacement of said pump, a second fluid motor for operating said member, and a unitary control valve driven by said first motor having a portion adapted to control said second motor to impart a predetermined cycle of movement to said first motor, said cycle including a period of controlled acceleration and a period of controlled deceleration, and having another portion adapted to control said second motor to bring said first motor to a predetermined position of rest independently of overtravel or undertravel of the first motor at the end of a cycle.

4. In a fluid pressure operated power transmission system the combination of a fluid pump, a fluid pressure motor, a member movable to control the supply of fluid delivered from the pump to the motor, an article handling device driven by the motor, and means to control operation of the article handling device in intermittent cycles of movement with predetermined acceleration and deceleration, said means including a second fluid motor for operating said member, and a unitary valve partaking of rotary and reciprocating movement and driven by said first fluid motor to control said second fluid motor, and fluid pressure operated means for moving said valve to initiate a cycle of operation.

5. In a fluid pressure operated power transmission system the combination of a fluid pump, a fluid pressure motor, an article handling device driven by the motor, and means to control operation of the article handling device in intermittent cycles of movement with predetermined acceleration and deceleration, said means including a unitary valve partaking of rotary and reciprocating movement, means coupling said valve to rotate with the fluid motor, and cam means for controlling the reciprocating motion of the valve in accordance with its rotary movement.

6. In a fluid pressure operated power transmission system the combination of a fluid pump, a fluid pressure motor, an article handling device driven by the motor, and means to control operation of the article handling device in intermittent cycles of movement with predetermined acceleration and deceleration, said means including a unitary valve partaking of rotary and reciprocating movement, means coupling said valve to rotate with the fluid motor, and cam means for controlling the reciprocating motion of the valve in accordance with its rotary movement, said valve being reciprocable at times independently of said cam.

7. In a fluid pressure operated power system the combination of a reversible variable displacement pump, a fluid pressure motor, continuously open supply and return conduits connecting said pump and motor, a member movable to vary the displacement of said pump, a second fluid motor for operating said member, and a unitary control valve driven by said first motor having a portion adapted to control said second motor to impart a predetermined cycle of movement to said first motor said cycle including a period of controlled acceleration and a period of controlled deceleration.

8. In a fluid pressure operated power system the combination of a reversible variable displacement pump, a fluid pressure motor, continuously open supply and return conduits connecting said pump and motor, a member movable to vary the displacement of said pump, a second fluid motor for operating said member, valve means operable by the first fluid motor for controlling the second fluid motor to cause a cycle of movement of the first motor including a period of predetermined acceleration and a period of predetermined deceleration, and by-pass means rendered effective at the end of a cycle for by-passing fluid delivered by the pump whenever the first fluid motor advances beyond a predetermined position.

9. In a fluid pressure operated power transmission system the combination of a fluid pump, a fluid pressure motor, a member movable to vary the displacement of the pump, an article handling device driven by the motor, and means to control operation of the article handling device in intermittent cycles of movement with predetermined acceleration and deceleration, said means including a second fluid motor for operating said member, valve means operable by the first fluid motor for controlling the second fluid motor to cause a cycle of movement of the first motor, and by-pass means rendered effective at the end of a cycle for by-passing fluid delivered by the pump whenever the first fluid motor advances beyond a predetermined position.

10. In a fluid pressure operated power system the combination of a reversible variable displacement pump, a fluid pressure motor, continuously open supply and return conduits connecting said pump and motor, a member movable to vary the displacement of said pump, a second fluid motor for operating said member, valve means operable by the first fluid motor for controlling the second fluid motor to cause a cycle of movement of the first motor including a period of predetermined acceleration and a period of predetermined deceleration, and valve means for controlling said second motor to maintain the first motor in a predetermined position of rest.

11. In a fluid pressure operated power transmission system the combination of a fluid pump, a fluid pressure motor, a member movable to vary the displacement of the pump, an article handling device driven by the motor, and means to control operation of the article handling device in intermittent cycles of movement with predetermined acceleration and deceleration, said means including a second fluid motor for operating said member, valve means operable by the first fluid motor for controlling the second fluid motor to cause a cycle of movement of the first motor, and valve means for controlling said second motor to maintain the first motor in a predetermined position of rest.

12. In a fluid pressure operated power transmission system the combination of a fluid pump, a fluid pressure motor, an article handling device driven by the motor, and means to control operation of the article handling device in intermittent cycles of movement with predetermined acceleration and deceleration, said means including a unitary valve partaking of rotary and reciprocating movement and driven by said fluid motor to control the supply of fluid delivered by the pump to the motor.

13. In a fluid pressure operated power transmission system the combination of a fluid pump, a fluid pressure motor, an article handling device driven by the motor, and means to control operation of the article handling device in intermittent cycles of movement with predetermined acceleration and deceleration, said means including a unitary valve partaking of rotary and reciprocating movement and driven by said fluid motor to control the supply of fluid delivered by the pump to the motor, said valve including a portion operable to control the supply of fluid to said motor between cycles.

14. In a fluid pressure operated power transmission system the combination of a fluid pump, a fluid pressure motor, an article handling device driven by the motor, and means to control operation of the article handling device in intermittent cycles of movement with predetermined acceleration and deceleration, said means including a unitary valve partaking of rotary and reciprocating movement and driven by said fluid motor to control the supply of fluid delivered by the pump to the motor, and fluid pressure operated means for moving said valve to initiate a cycle of operation.

THOMAS B. DOE.